350-96.24

XR 3,805,027

SEARCH ROOM

United State

Azure, Jr.

SUBSTITUTE FOR MISSING XR

[11] 3,805,027

[45] Apr. 16, 1974

[54] AUTOMATIC CLEANING OF FIBER OPTICS PROBE

[75] Inventor: Leo L. Azure, Jr., Richland, Wash.

[73] Assignee: Chatsworth Data Corporation, Chatsworth, Calif.

[22] Filed: July 10, 1972

[21] Appl. No.: 270,133

[52] U.S. Cl. .......................... 235/61.11 E, 250/219 R
[51] Int. Cl. .......................... G06k 7/10, G08c 9/06
[58] Field of Search 235/61.11 R, 61.11 E, 61.11 D; 250/219 R, 219 Q, 219 D

[56] References Cited

UNITED STATES PATENTS

| | | | |
|---|---|---|---|
| 3,124,675 | 3/1964 | Epstein | 235/61.11 E |
| 3,175,747 | 3/1965 | Comstock | 235/61.11 E |
| 3,370,157 | 2/1968 | Lockey | 235/61.11 R |
| 3,549,867 | 12/1970 | Malone | 235/61.11 E |
| 3,676,690 | 7/1972 | McMillin et al. | 235/61.11 E |

*Primary Examiner*—Daryl W. Cook
*Attorney, Agent, or Firm*—Staas, Halsey & Gable

[57] ABSTRACT

The fiber optics probe of a high speed optical mark reader is caused to be wiped by the leading edge of each of successive documents transported to and past the probe for reading thereby eliminating the problem of accumulation of dust, lint or other foreign material on an exposed, sensing end of the probe. A support surface along which a document is transported is formed with an opening therein, in communication with a well. The fiber optics probe is mounted upon a support block disposed above the opening in the support surface. The sensing end of the probe is displaced by a distance just slightly greater than the thickness of a document from the plane of the support surface which extends from either side of the well. An end surface of the optics support block is configured along at least one edge thereof to provide a surface disposed at an angle with respect to the end surface. The sensing end of the fiber optics probe is exposed through the angled surface so that the angled surface of the optics support block is engaged by the leading edge of a document being fed for reading along the surface, prior to engagement of the document's leading edge with the sensing end of the optics probe. Further, a resilient biasing means urges each document as it is being fed, upwardly from the support surface to engage the angled surface of the optics block, thereby wiping the end of the probe. The document being fed is then displaced downwardly due to the angle of the angled surface and passes therebeneath along the end surface of the optics support block, during which the document is no longer in direct contact with the probe.

7 Claims, 3 Drawing Figures

AUTOMATIC CLEANING OF FIBER OPTICS PROBE

BACKGROUND OF THE INVENTION

1. Field of the Invention

This invention relates to optical readers, and more particularly, to a structure adapted for cleaning automatically the ends of fiber optics probes, thereby to assure accurate reading capabilities.

2. State of the Prior Art

In optical mark readers and in particular high speed mark readers, the accumulation of dust, lint or other foreign material such as graphite collected from pencil marks, on the sensing ends of the optical sensing devices presents a major problem. Routine maintenance must be provided to remove the accumulated material, since this material can cause extreme changes in the optical characteristics of the system and thus result in incorrect reading of data. Heretofore, the only approach to the problem was to provide routine maintenance to the optical mark reading equipment to remove this accumulated material. It is apparent, however, that even with routine maintenance, material will accumulate and cause changes in the optical characteristics thus reducing the accuracy of the device's reading capability.

SUMMARY OF THE INVENTION

In accordance with the invention, the problem of accumulation of dust, lint or other foreign materials such as graphite, which typically may collect on the fiber optics reading element, is eliminated by wiping the sensing element with the leading edge of each successively fed document. In the exemplary embodiment herein disclosed, an optics block contains a plurality of fiber optics probes for reading corresponding columns of marking areas on a document or a plurality of documents fed thereby in succession. Typically, the marking areas include a column of timing marks and a number of columns of data markings, these data markings being arranged in rows related to the timing marks. The problem of accumulation of material on the reading element is present regardless of the nature of the markings on the documents, because, for example, the lint or dust conveyed by each document may accumulate on the reading element. Punch cards frequently may be punched imperfectly and thus residue material from the punching may be on the card and attribute to the accumulated material. A frequently encountered problem exists with pencil marks in that the graphite of the pencil may be transferred to and accumulate on the reading element. Accordingly, the material accumulation on the reading element has been found to be a problem with any type of card and/or indicia thereon.

This invention automatically eliminates this problem by wiping the sensing end of the fiber optics reading element with the leading edge of each document being fed for reading by the reading element. Then the document is directed away from the sensing end and into a feed path spaced from the sensing end so that as the document is being transported past the sensing end, it is not in direct contact therewith during the actual reading operation. For this purpose, an optics support block containing the fiber optics probes has a surface disposed at an angle with respect to the document feed path to receive the leading edge of a document, the optical sensing devices such as fiber optics probes being exposed through the angled surface. A support surface along which the documents are fed is formed with an opening therein, the opening being disposed between a forward and rear portion of the support surface in communication with a well; the optics support block is positioned above the well and has a second guide surface displaced from the document feed path as defined by the support surfaces, a distance slightly in excess of the thickness of a document. Thus, the materials which accumulate on the sensing ends of the optics probes are wiped by the leading edges of the documents into the underlying well.

Resilient biasing means is affixed to the forward portion of the support surface adjacent the well, to direct each document so that its leading edge engages the angled surface of the optics support block. First and second drive means are associated with the forward and rear portions of the support surface, respectively; the second drive means having a higher tangential driving speed than the first drive means. This arrangement assures that the document, when engaged by both of the first and second driving means, is maintained taut and thus, is transported in a flat or planar configuration past the optics support block, assuring accurate reading of the data therefrom.

Figure 1:
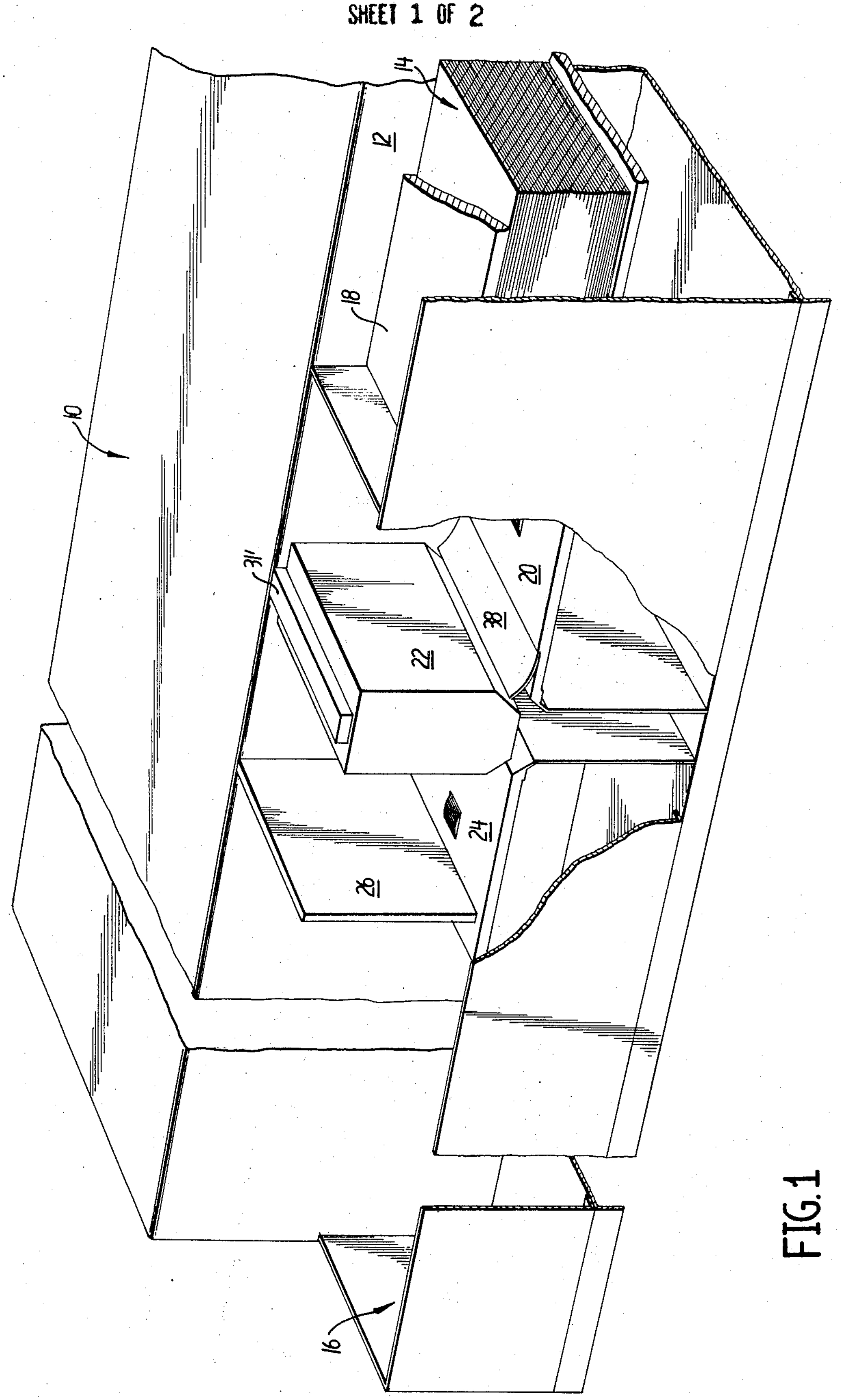
FIG. 1 is a perspective and simplified, partially broken away, view of a high speed card reader incorporating the self cleaning structure in accordance with the invention.

DETAILED DESCRIPTION OF THE INVENTION:

In the perspective view of FIG. 1, there is shown a perspective view of a high speed card reader 10 incorporating the self cleaning apparatus of this invention.

Particularly, in FIG. 1, a side panel of the reader 10 may be moved to disclose the interior working parts and the parts pertinent to this invention. A more detailed illustration of the card reader 10, as shown in FIG. 1, is afforded in the pending application of Leo L. Azure, entitled "Document Feeding Mechanism," Ser. No. 121,411, filed Mar. 5, 1971, and assigned to the assignee of the present invention.

In FIG. 1, the reader 10 is shown to include an input hopper 12 for receiving a stack of documents such as cards 14 to be fed by the device for reading, and an output hopper area 16 in which the cards 14 after reading are stacked. The cards 14 are held flat within the hopper 12 by a weight 18 of conventional type. A suitable bottom feed mechanism (not shown) is provided for feeding one of the cards 14 at a time from the stack thereof through a throat (not shown) at the front end of the hopper. The card 14 thus fed is transported along a forward support surface 20, past the lower end of an optics support block 22, along a rear support surface 24 and beneath a plate 26 defining an exhaust port from which the cards 14 are exited into output hopper area 16.

Figure 2:
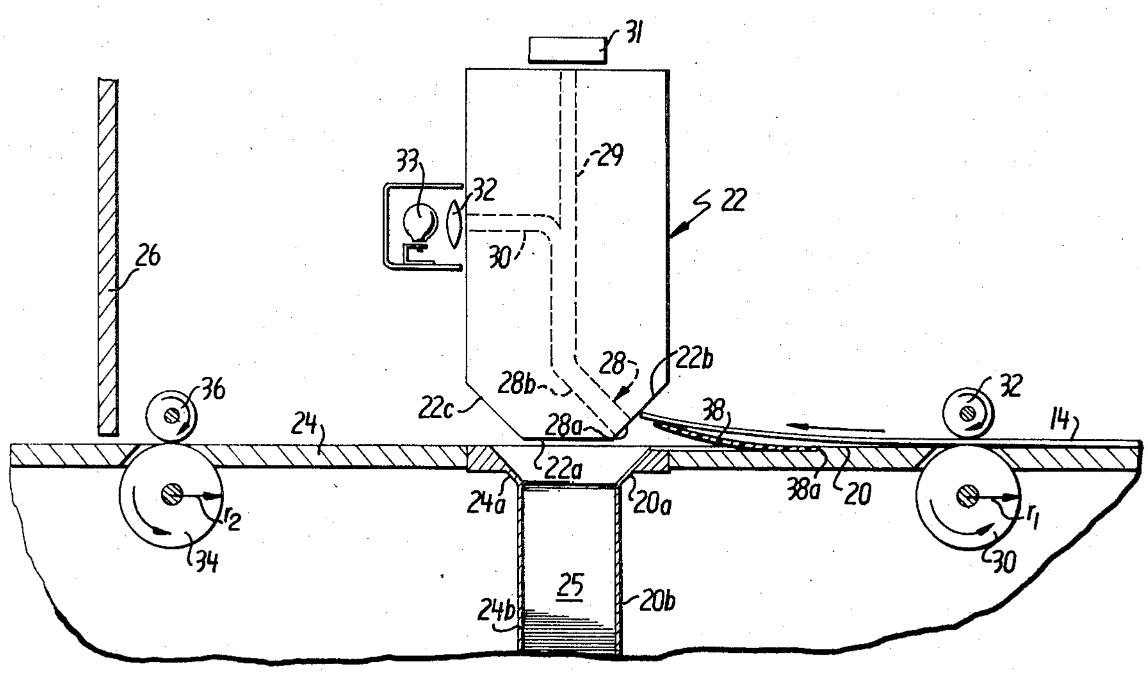
FIG. 2 is a simplified, cross sectional view illustrating the device of FIG. 1 and particularly showing the leading edge of a document being fed so as to engage the angled surface of the optics support block containing the exposed, sensing ends of the fiber optics probes.
Figure 3:
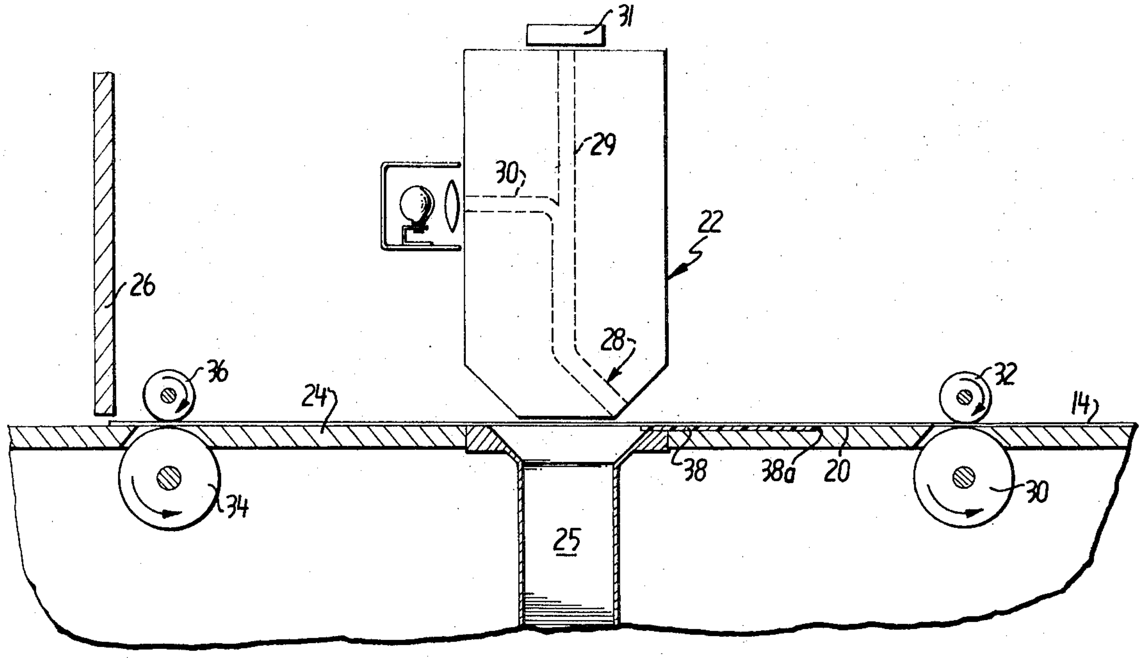
FIG. 3 is a view corresponding to that of FIG. 2 showing the position of a document whose leading edge is disposed forwardly of the optics support block and which is engaged by both of the first and second drive means during reading of data from the document.

Referring concurrently to FIGS. 1, 2 and 3, the optics support block 22 contains therein suitable optical sensing devices in the form, as herein disclosed, of a bifurcated optics probe indicated generally by the numeral 28, seen in hidden view in FIG. 2. The optics probe 28 is split or bifurcated at an upper end portion, into a receiving bundle 29 and a transmitting bundle 30. Associated with the receiving bundle 29 is a corresponding photosensitive device 31 which may comprise a conventional photocell or preferably a solid state light sensitive device, and associated with the transmitting bundle 30 is a lens system 32 and a suitable source of radiation such as a lamp 33. The bundles 29 and 30 of the probe 28 are comingled to form a composition portion 28*b*, each fiber of each of the bundles 29 and 30, however, remaining functionally isolated to transmit radiation without substantial transfer to or from another fiber. Thus, in such a device, the transmitting bundle 30 transmits light from the lamp 33 to an exposed or sensing end 28*a* of the probe 28 for illuminating areas to read, and reflected light from the surface of the document 14 at that particular area is captured or accepted by the receiving fibers of the bundle 29 associated with photosensitive device 31 In FIG. 1, the plurality of individual photosensitive devices 31 are shown at 31′. With reference to the cards 14, it will be appreciated that an optics probe 28 is provided for each of the columns of the card to be sensed and specifically for each of the timing marks column and data marks columns.

Referring again concurrently to FIGS. 1, 2 and 3, the optics support block 22 is provided with a bottom surface 22*a* extending along the document feed path and a surface 22*b* disposed at an angle with respect to the document feed path and the surface 22*a*. Further, the rear edge of the block 22 at the lower end is preferably cut to define an angled surface 22*c*. The forward support surface 20 includes an angled surface 20*a*, and the rear support surface 24 similarly includes an angled surface 24*a*. As shown, the surfaces 24*a* and 22*c*, and the surfaces 20*a* and 22*b* are approximately parallel to one another, and the angle thereof relative to the horizontal is preferably equal and of about 45°. The angle however, is not critical other than it affords the deflection of the cards 14 in a manner to be described below. The angled portions 20*a* and 24*a* join respectively vertical side walls 20*b* and 24*b* defining a well area 25 therebetween for receiving the accumulated material wiped from the angled surface 22*b* of the optics support block 22, as later described.

Associated with the forward support 20 is a first drive means comprising a first drive roller 30 and associated pinch roller 32 and, with the rear support surface 24, a second drive means comprising a second drive roller 34 and associated pinch roller 36. As explained in the above referenced application, suitable motor means is coupled to these rollers.

A resilient biasing element 38 is disposed on the forward support surface 20, adjacent the angled surface 20. As seen in FIG. 1, the resilient biasing element 38 may extend substantially the entire width of the block 22 and thus be generally the same width as the card 14. The element 38 may be of any suitable material such as a resilient plastic which can be cemented firmly to the support surface 20 and is sufficiently flexible as to perform the functions hereafter described. Further, the resilient element 38 may be of a small thickness and/or have a beveled edge to present no impediment to the forward movement of a card 14 during the feeding operation. If desired, of course, a suitable notch 38*a* may be formed in the support surface 20 so as to receive the element 38 therein, the element 38 thereby lying entirely below the plane of the surface 20 in the deflected position as shown in FIG. 3.

The operation of this invention is readily apparent from FIGS. 2 and 3. A card 14, when fed from the hopper 12 and engaged by the drive roller 30 and the pinch roller 32 is advanced with its leading edge riding along the resilient element 38 to engage the angled surface 22*b* of the optics support block 22. Continued drive by rollers 30 and 32 then advances the leading edge of the card 14 down the angled surface 22*b*, wiping the exposed ends 28*a* of the plurality of probes 28 as shown in FIG. 2; thereafter the card 14 passes beneath the bottom surface 22*a* of the block 22 and along the rear support surface 24 to be engaged by the drive roller 34 and the associated pinch roller 36. The drive roller 34 imparts a slightly greater translational speed to the card 14 than does the roller 30, thereby assuring that the card 14 lies flat or taut between the two sets of rollers in the area of optical scanning by the optics probes 28. As best appreciated from FIG. 3, the bottom surface 22*a* of the block 22 is spaced from the imaginary plane defined by the forward and rear support surfaces 20 and 24 by a distance which is just slightly greater than the thickness of a single card 14. Further, as seen from FIG. 3, when the card 14 is engaged by both sets of the drive rollers, the resilient element 38 is deflected downwardly whereby the card 14 is in a substantially planar configuration between the two sets of rollers. It further will be appreciated that as the card 14 is deflected in passing from the position shown in FIG. 2 to the position shown in FIG. 3, any accumulated material on the angled surface 22*b* and the ends 28*a* of the probes 28 will be wiped into the well 25.

Further, during the actual reading operation, it will be appreciated from FIG. 3 that the card 14 is not in direct contact with the sensing ends 28*a* of the probes 28 during reading. It further is to be noted that the dimensions employed in the figures for illustrating the subject invention are, particularly in the case of the thickness of the optics support block 22 as seen in FIGS. 2 and 3, substantially increased over the actual devices, as is the distance between the two sets of drive rollers. In an actual device, the position of data on the cards to be read relative to the length of the cards is such that the card assumes the position shown in FIG. 3, i.e., engaged by both sets of drive rollers, before the first data marks to be read approach the sensing ends 28*a* of the probes 28.

Numerous changes may be made in the above-described apparatus and the diferent embodiments of the invention may be made without departing from the spirit thereof; therefore, it is intended that all matter contained in the foregoing description and in the accompanying drawings shall be interpreted as illustrative and not in a limiting sense.

What is claimed is:

1. In an optical card reader having means for advancing, in succession, each of a plurality of indicia bearing cards to be fed past an optical reading assembly comprising at least one optics probe having a sensing end for scanning the indicia of the cards, said card reader comprising:

a. a support surface for providing a feedpath along which each card is transported, in succession, for reading;

b. said reading assemb2y being spaced from the support surface by a distance at least as great as the thickness of an individual card; and c. said reading assembly includes a surface disposed at an acute angle relative to said support surface and at which said sensing end of said optics probe is exposed, for receiving the leading edges of the cards directed thereto in wiping relation with respect to said angled surface and said sensing end of said probe.

2. The card reader as claimed in claim 1, wherein there is included:

resilient means normally urging a card being fed thereby to engage said angled surface at its leading edge so that the leading edge of said card is deflected across said exposed, sensing end of said optics probe to wipe and thereby clean the same, and thereafter to be directed past said reading assembly, thereby deflecting said resilient means toward said support surface.

3. The card reader as recited in claim 2, wherein said support surface comprises:

a forward support surface and a rearward support surface each including a wall portion generally normal to the plane of said forward and rearward support surfaces, said wall portions being spaced apart by an amount generally corresponding to the dimension along the card feed path of said reading assembly to define a well therebetween for receiving the materials wiped from said reading assembly by the leading edge of each card.

4. The card reader as claimed in claim 3, wherein said forward support surface is joined to its associated wall portion by an angularly extending surface portion, said surface portion being disposed generally parallel to said angled surface of said reading assembly.

5. The card reader as claimed in claim 4, wherein said reading assembly includes a second surface disposed rearwardly thereof at an acute angle with respect to said rearward support surface; and said rearward support surface is joined to its associated wall portion by an angularly extending surface portion, said last-mentioned surface portion being disposed generally parallel to said second surface of said reading assembly.

6. The card reader as claimed in claim 2, wherein said reading assembly includes a bottom surface portion disposed generally parallel to the card feed path for facilitating the feeding of cards therealong.

7. A method for effecting cleaning of the sensing end of a fiber optics probe of an optical card reader, said method comprising the steps of:

a. providing a guide surface disposed at an acute angle with respect to the feedpath along which the cards are to be advanced and disposing the sensing end of the probe at said guide surface exposed for scanning the card;

b. advancing a card to be read along the feedpath so that the leading edge thereof engages and wipes across the guide surface and the sensing end of the probe; and c. transporting the card past the sensing end of the probe following the wiping action, along the feedpath spaced from the sensing end of the probe for effecting reading of data from the card.

* * * * *